(12) United States Patent
Higuchi

(10) Patent No.: US 6,747,944 B2
(45) Date of Patent: Jun. 8, 2004

(54) OPTICAL RECORDING MEDIUM

(75) Inventor: Takanobu Higuchi, Tsurugashima (JP)

(73) Assignee: Pioneer Corporation, Tokyo-To (JP)

( * ) Notice: Subject to any disclaimer, the term of this patent is extended or adjusted under 35 U.S.C. 154(b) by 404 days.

(21) Appl. No.: 09/885,170

(22) Filed: Jun. 21, 2001

(65) Prior Publication Data

US 2002/0015381 A1 Feb. 7, 2002

(30) Foreign Application Priority Data

Aug. 4, 2000 (JP) .................................. P2000-236478

(51) Int. Cl.$^7$ ................................................. G11B 7/24
(52) U.S. Cl. ................................................... 369/286
(58) Field of Search ............................. 369/286, 288, 369/283, 284, 272; 430/270.1, 270.11, 270.12, 271.1, 945; 428/64.1, 64.2, 64.4, 64.6, 64.7, 64.9

(56) References Cited

U.S. PATENT DOCUMENTS

| 4,450,553 | A | * | 5/1984 | Holster et al. ............ 369/275.5 |
| 5,373,499 | A | * | 12/1994 | Imaino et al. ............ 369/275.4 |
| 5,871,881 | A | * | 2/1999 | Nishida et al. ........ 430/270.11 |
| 6,160,787 | A | * | 12/2000 | Marquardt et al. ....... 369/275.1 |
| 6,177,168 | B1 | * | 1/2001 | Stevens ..................... 428/64.1 |
| 6,544,616 | B2 | * | 4/2003 | Nee ............................ 428/64.1 |

FOREIGN PATENT DOCUMENTS

| JP | 9-293270 | 11/1997 |
| JP | 11-283278 | 10/1999 |

OTHER PUBLICATIONS

Patent Abstracts of Japan –Publication No. 09–293270.
Patent Abstracts of Japan –Publication No. 11–283278.

* cited by examiner

Primary Examiner—A. J. Heinz
Assistant Examiner—Angel Castro
(74) Attorney, Agent, or Firm—Sughrue Mion, PLLC

(57) ABSTRACT

To present an optical recording medium having four or more information recording planes which can be read from one side. A first reflective layer 3 has a layer mainly composed of titanium oxide, a second reflective layer 5 has a layer mainly composed of titanium oxide, a third reflective layer 7 has a layer of an alloy mainly composed of silver, and a fourth reflective layer 9 has a layer of an alloy mainly composed of aluminum.

9 Claims, 6 Drawing Sheets

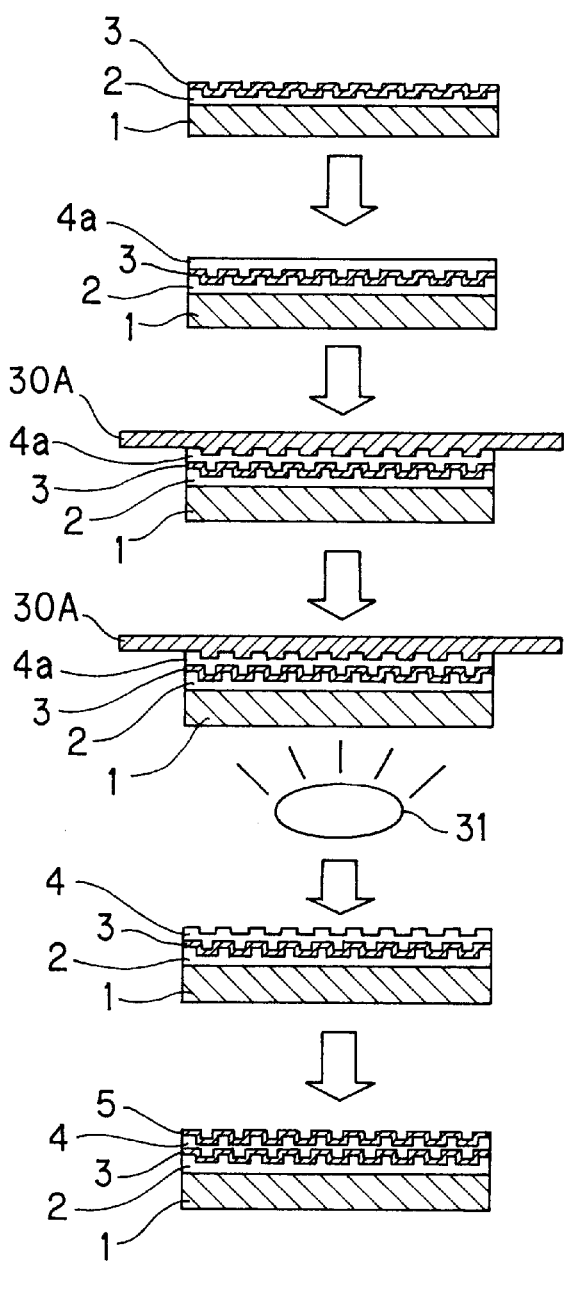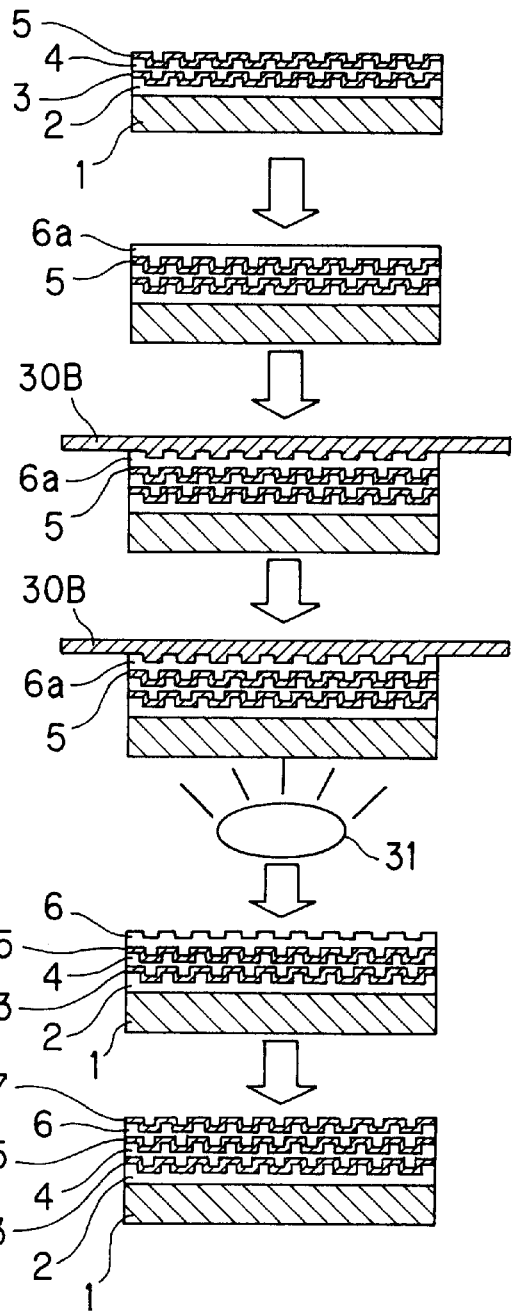

OPTICAL RECORDING MEDIUM

BACKGROUND OF THE INVENTION

1. Field of the Invention

The present invention relates to an optical recording medium having a plurality of information recording planes for reproducing information by laser beam having a wavelength of 400 nm±5 nm.

2. Description of the Related Art

An optical recording medium having a plurality of information recording planes is realized today. Such recording medium, for example, a DVD (digital versatile disk) has two or four information recording planes, and the information of two information recording planes can be read without inverting the disk in the former type. In the latter type, by inverting the disk, the information of two information recording planes can be read out from both sides of the disk.

Incidentally, Japanese Laid-open Patent No. 11-283278 discloses an optical recording medium having three information recording planes capable of reading from one side.

From the viewpoint of enhancing the recording density in the optical recording medium, and enhancing the convenience of use, it is effective to increase the number of information recording planes that can be read from one side.

It is hence an object of the invention to present an optical recording medium having four or more information recording planes capable of reading from one side.

SUMMARY OF THE INVENTION

The optical recording medium of the invention is an optical recording medium (100) comprising at least four information recording planes and (first to fourth) reflective layers (3, 5, 7, 9) formed on first to fourth information recording planes (3a, 5a, 7a, 9a) respectively, in which the first reflective layer (3) has a layer mainly composed of titanium oxide, the second reflective layer (5) has a layer mainly composed of titanium oxide, the third reflective layer (7) has a layer made of an alloy mainly composed of silver or a layer laminating the silver alloy layer with the titanium oxide layer, and the fourth reflective layer (9) has a layer made of an alloy mainly composed of aluminum.

According to the invention, since the first reflective layer (3) has a layer mainly composed of titanium oxide, the second reflective layer (5) has a layer mainly composed of titanium oxide, the third reflective layer (7) has a layer made of an alloy mainly composed of silver or a layer laminating the silver alloy layer with the titanium oxide layer, and the fourth reflective layer (9) has a layer made of an alloy mainly composed of aluminum, variations of reflected light quantity from each reflective layer can be suppressed. The information on the first to fourth information recording planes (3a, 5a, 7a, 9a) can be read from one side of the optical recording medium by using laser beam having a wavelength of 400±5 nm. The invention also comprises other reflective layer than the first to fourth reflective layers (3, 5, 7, 9), that is, it is applicable also to an optical recording medium having five or more reflective layers. The invention is further applicable to a play-only type optical recording medium. One or arbitrary plural layers of the first to fourth reflective layers (3, 5, 7, 9) may be formed in a laminated structure. The first to fourth information recording planes (3a, 5a, 7a, 9a) are formed on each plane of the first to fourth transfer layers (2, 4, 6, 8) touching with the first to fourth reflective layers (3, 5, 7, 9), respectively. The transfer layers may be formed as cured article of liquid or semisolid plate of photosetting resin such as polyacrylate resin, polymethacrylate resin and the like. As a quality of material of the transfer layers, thermosetting resin such as polycarbonate resin and the like may be used, as well. The information recorded in the optical recording medium can be supported in undulations, that is, phase pits of the first to fourth information recording planes (3a, 5a, 7a, 9a).

The titanium oxide in the first and second reflective layers (3, 5) is preferably composed of oxygen/titanium at a ratio of 1.8 or more to 2.2 or less. In this case, since an optical characteristic close to that of titanium dioxide ($TiO_2$) can be obtained, the reflectivity and transmissivity of the first and second reflective layers (3, 5) can be controlled adequately in particular.

The layer mainly composed of titanium oxide in the first and second reflective layers (3, 5) is preferably either amorphous or fine crystal composition. In this case, the first and second reflective layers (3, 5) are homogeneous optically. The amorphous or fine crystal composition is same as amorphous composition optically.

The thickness of the first and second reflective layers (3, 5) is preferably 80 nm or less. The lower limit of the thickness may not necessarily be limited as long as the layers can be formed uniformly. Practically about 10 nm or so may be a lower limit. In this case, the reflectivity and transmissivity of the first and second reflective layers (3, 5) can be controlled adequately in particular.

The alloy mainly composed of silver in the third reflective layer (7) preferably contains either palladium or ruthenium, and either copper or titanium, and the ratio of silver in the composition is 94 percent by weight or more. In this case, the reflectivity and transmissivity of the third reflective layer (7) can be controlled adequately in particular.

The thickness of the third reflective layer (7) is preferably 20 nm or less. The lower limit of the thickness may not necessarily be limited as long as the layers can be formed uniformly as mentioned above. In this case, the reflectivity and transmissivity of the third reflective layer (7) can be controlled adequately in particular.

The third reflective layer (7) is preferably formed by laminating the layer of alloy mainly composed of silver, and a layer mainly composed of titanium oxide. In this case, since the absorption rate of the third reflective layer (7) can be decreased, the reflectivity and transmissivity can be controlled adequately in particular.

The titanium oxide in the third reflective layer (7) is preferably composed of oxygen/titanium at a ratio of 1.8 or more to 2.2 or less. In this case, the reflectivity and transmissivity of the third reflective layer (7) can be controlled adequately in particular.

The layer mainly composed of titanium oxide in the third reflective layer (7) is preferably either amorphous or fine crystal composition. In this case, the third reflective layer (7) is homogeneous optically. The amorphous or fine crystal composition is same as amorphous composition optically.

The thickness of the layer mainly composed of titanium oxide in the third reflective layer (7) is 80 nm or less. The lower limit of the thickness may not necessarily be limited as long as the layers can be formed uniformly as mentioned above. In this case, the reflectivity and transmissivity of the third reflective layer (7) can be controlled adequately in particular.

The alloy mainly composed of aluminum in the fourth reflective layer (9) preferably contains at least one of titanium, chromium, zinc, manganese, and copper, and the ratio of aluminum in the composition is 90 percent by weight or more. In this case, the reflectivity of the fourth reflective layer (9) has a larger value.

The thickness of the layer of alloy mainly composed of aluminum in the fourth reflective layer (9) is 20 nm or more. In this case, the reflectivity of the fourth reflective layer (9) has a larger value.

The ratio of maximum and minimum is preferably 2 times or less, among the reflected light quantity from the first reflective layer (3), the reflected light quantity from the second reflective layer (5) passing through first reflective layer (3), the reflected light quantity from the third reflective layer (7) passing through the first reflective layer (3) and second reflective layer (5), and the reflected light quantity from the fourth reflective layer (9) passing through the first reflective layer (3), second reflective layer (5), and third reflective layer (7).

In this case, since the information recorded corresponding to each reflective layer can be read accurately, a practical optical recording medium having four layers of information recording planes can be obtained. When applied in an optical recording medium having other reflective layer than the first to fourth reflective layers (3, 5, 7, 9), that is, having five or more reflective layers, the ratio of maximum and minimum of reflected light quantities from five reflective layers is set at 2 times or less.

The optical recording medium of the invention is also an optical recording medium (100) comprising first to fourth reflective layers (3, 5, 7, 9) formed on first to fourth information recording planes (3a, 5a, 7a, 9a) respectively, in which the ratio of maximum and minimum is preferably 2 times or less, among the reflected light quantity from the first reflective layer (3), the reflected light quantity from the second reflective layer (5) passing through first reflective layer (3), the reflected light quantity from the third reflective layer (7) passing through the first reflective layer (3) and second reflective layer (5), and the reflected light quantity from the fourth reflective layer (9) passing through the first reflective layer (3), second reflective layer (5), and third reflective layer (7).

According to the invention, since variations are suppressed so that the ratio of maximum and minimum of reflected light quantities from each reflective layer may be 2 times or less, the information recorded corresponding to each reflective layer can be read accurately. Therefore, a practical optical recording medium having four layers of information recording planes can be obtained. As far as the reflectivity and transmissivity of each reflective layer can be adequately controlled, the material is not particularly limited. The information on the first to fourth information recording planes (3a, 5a, 7a, 9a) can be read from one side of the optical recording medium by using laser beam. The invention also comprises other reflective layer than the first to fourth reflective layers (3, 5, 7, 9), that is, it is applicable also to an optical recording medium having five or more reflective layers. In this case, the ratio of maximum and minimum of reflected light quantities from five reflective layers is set at 2 times or less. The invention is further applicable to a play-only type optical recording medium. The first to fourth information recording planes (3a, 5a, 7a, 9a) may be formed as cured matter of liquid photosetting resin or cured matter of semisolid flat photosetting resin. The information recorded in the optical recording medium can be supported in undulations, that is, phase pits of the first to fourth information recording planes (3a, 5a, 7a, 9a).

For the ease of understanding of the invention, reference numerals in the accompanying drawings are indicated in parentheses, but it must be noted that the invention is not limited to the illustrated embodiments alone.

BRIEF DESCRIPTION OF THE DRAWINGS

FIG. 5 is a diagram showing a process up to forming of a third reflective layer, in which (a) shows a process up to forming of a second reflective layer, and (b) shows a process up to forming of a third reflective layer.

DESCRIPTION OF THE PREFERRED EMBODIMENT

Referring now to FIGS. 1–6, a preferred embodiment of an optical recording medium of the invention is described below. This embodiment is an example of applying the optical recording medium of the invention in a play-only type four-layer disk.

Figure 1:
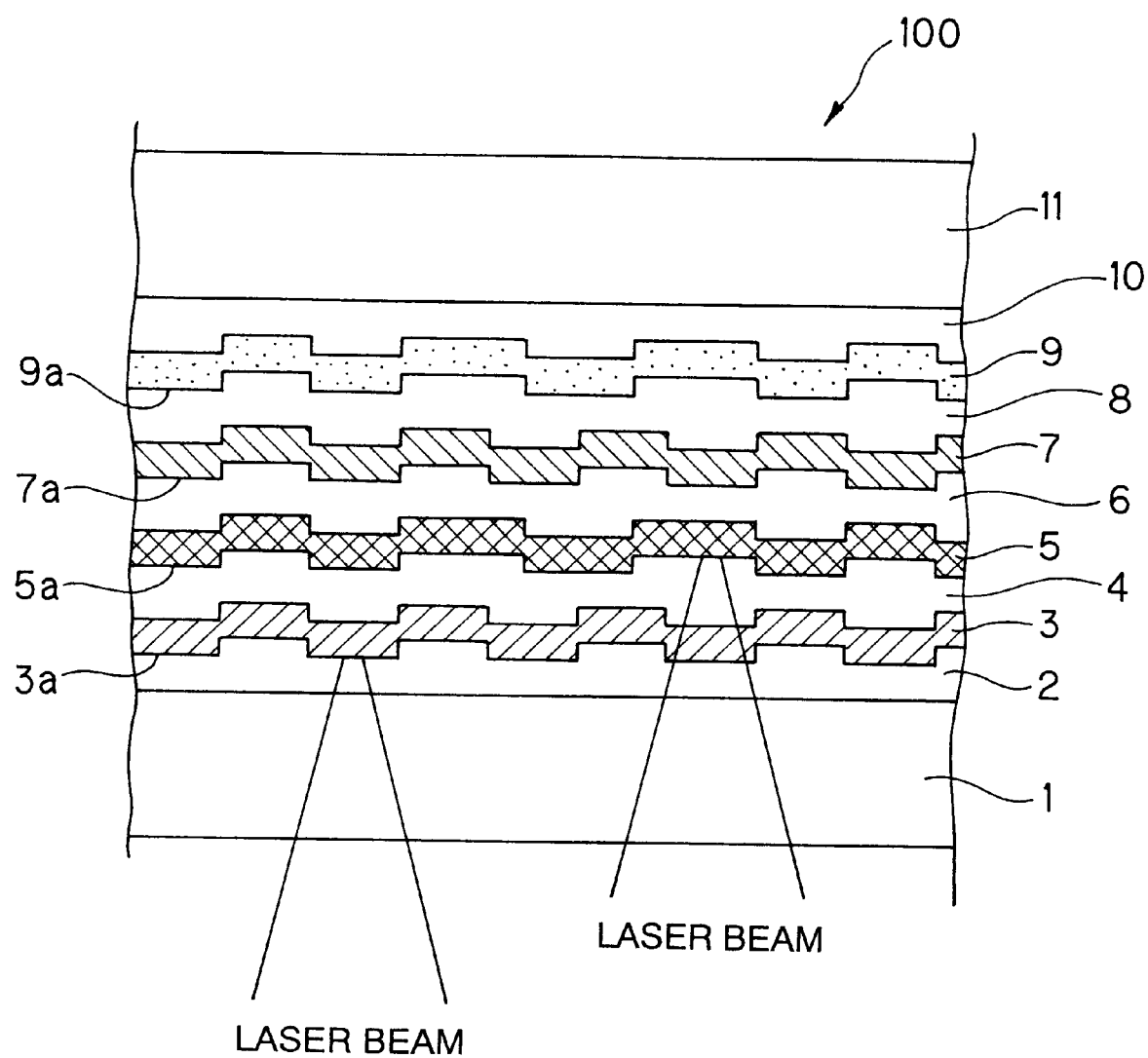
FIG. 1 is a sectional view showing a four-layer disk.

FIG. 1 is a sectional view showing a four-layer disk. As shown in FIG. 1, a four-layer disk 100 comprises, sequentially from bottom to top in FIG. 1, a first substrate 1, a first transfer layer 2, a first reflective layer 3, a second transfer layer 4, a second reflective layer 5, a third transfer layer 6, a third reflective layer 7, a fourth transfer layer 8, a fourth reflective layer 9, an adhesive layer 10, and a second substrate 11.

The first substrate is, for example, a glass substrate being chemically reinforced and polished sufficiently on the surface. For example, it is a glass substrate of 120 mm in outside diameter, 15 mm in inside diameter, and about 0.52 mm in thickness. As the substrate, such material as polycarbonate resin, polyacrylate resin, polymethacrylate resin and the like may be used.

The first transfer layer 2, second transfer layer 4, third transfer layer 6, fourth transfer layer 8, and adhesive layer 10 are formed of photosetting resin such as polymethacrylate resin. In the first to fourth transfer layers 2, 4, 6 and 8, a plurality of pits are formed for supporting the information in the size suited to the wavelength of laser beam for reproduction. Same as in an ordinary optical disk, pits are arranged spirally to form tracks, and the first reflective layer 3, second reflective layer 5, third reflective layer 7, and fourth reflective layer 9 are formed in an undulated shape conforming to the shape of the transfer layers 2, 4, 6 and 8. As a result, the first reflective layer 3 is formed in a specified shape oppositely to an information recording plane 3a, the second reflective layer 5 to an information recording plane 5a, the third reflective layer 7 to an information recording plane 7a, and the fourth reflective layer 9 to an information recording plane 9a.

The thickness of the first transfer layer 2 is about 20 nm, and the thickness of the second transfer layer 4, third transfer layer 6 and fourth transfer layer 8 is about 30 nm. The distance from the surface of the first substrate 1 (the top in FIG. 1) to the central position in the thickness direction (vertical direction in FIG. 1) of the third transfer layer 6, that is, the distance from the top in FIG. 1 of the first substrate 1 to the intermediate position between the upper and lower ends in FIG. 1 of the third transfer layer 6 is about 0.6 mm. Therefore, the first information recording plane 3a and fourth information recording plane 9a, and the second information recording plane 5a and third information recording plane 7a are formed at symmetrical positions to the plane of about 0.6 mm apart from the first substrate 1, respectively.

The first reflective layer 3 and second reflective layer 5 are made of titanium oxide (TiOx, where x is 1.8 or more to 2.2 or less), and the thickness of the first reflective layer 3 is 20 nm, and the thickness of the second reflective layer 5 is 28 nm.

The third reflective layer 7 has a laminated structure consisting of a layer made of an alloy mainly composed of silver ($Ag_{98.1}Pd_{0.9}Cu_{1.0}$ of Furuya Metal), and a layer of titanium oxide (TiOx, where x is 1.8 or more to 2.2 or less), and the thickness of the layer of alloy mainly composed of silver is 9 nm, and the thickness of the layer of titanium oxide is 40 nm. The fourth reflective layer 9 is made of a metal mainly composed of aluminum ($Al_{99}Ti_1$), and the thickness of the fourth reflective layer 9 is 50 nm. Herein, the fourth reflective layer may be composed of aluminum, that is, a single aluminum layer instead of an alloy.

The second substrate 11 may be, for example, made of a same material as the first substrate 1. The second substrate 11 is adhered to the fourth reflective layer 9 through the adhesive layer 10, so that the fourth reflective layer 9 may be protected.

Figure 2A:
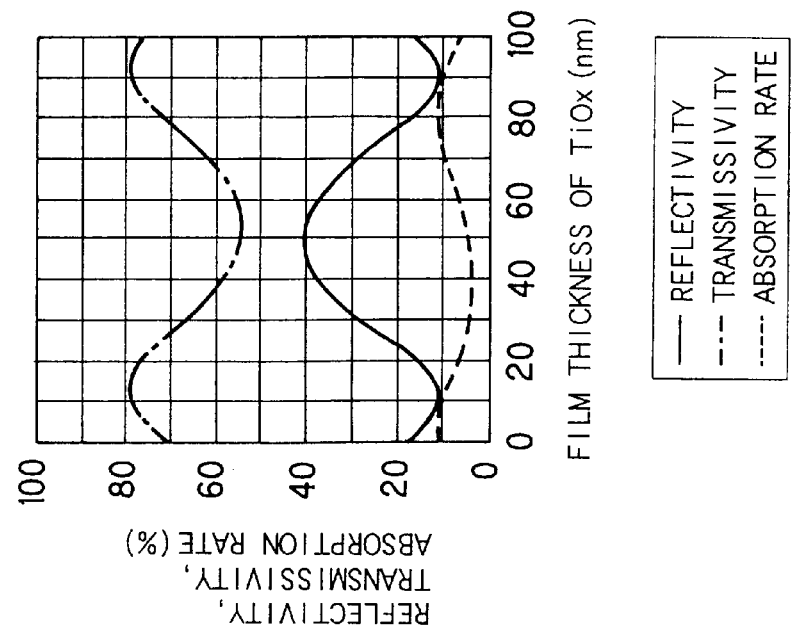
FIG. 2 is a diagram showing reflectivity, transmissivity, and absorption rate of a laminated structure comprising a layer of alloy mainly composed of silver and a layer of titanium oxide, in which (a) is a diagram showing a case of fixing the thickness of titanium oxide at 40 nm and varying the thickness of the alloy mainly composed of silver, and (b) is a diagram showing a case of fixing the thickness of the alloy mainly composed of silver at 10 nm and varying the thickness of titanium oxide.
Figure 2B:
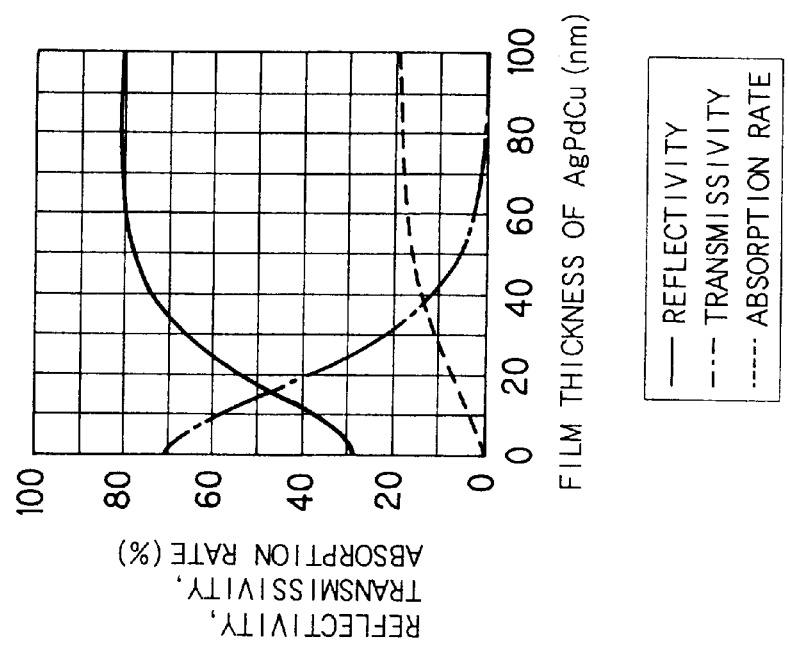
Figure 3:
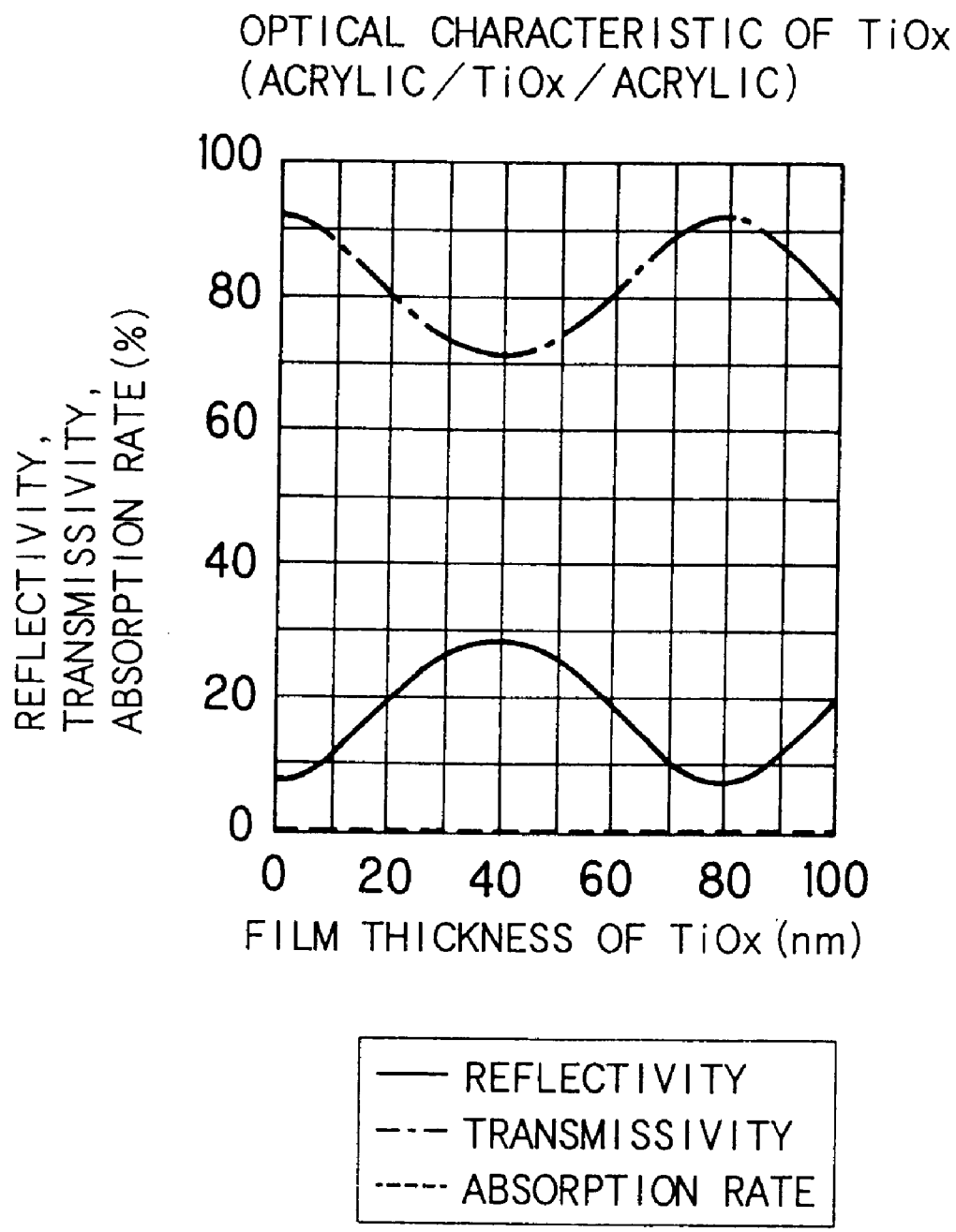
FIG. 3 is a diagram showing reflectivity, transmissivity, and absorption rate of titanium oxide in relation to the film thickness of titanium oxide.

Referring next to FIG. 2 and FIG. 3, the reflected light quantities from the first to fourth reflective layers 3, 5, 7 and 9 are explained. Generally, in a multi-layer disk, the quantities of the light reflected from each reflective layer and reaching up to the pickup are required to be kept nearly at constant values, and therefore it is required to compose so that (1) the reflected light quantity from the first reflective layer 3, (2) the reflected light quantity from the second reflective layer 5 returning after passing the first reflective layer 3 twice, (3) the reflected light quantity from the third reflective layer 7 returning after passing the first reflective layer 3 and second reflective layer 5 twice each, and (4) the reflected light quantity from the fourth reflective layer 9 returning after passing the first reflective layer 3, second reflective layer 5, and third reflective layer 7 twice each should be equal to each other as far as possible. To read pits correctly, the ratio of the maximum and minimum values of the reflected light quantities (1) to (4) must be suppressed at 2 times or less.

Specific conditions for equalizing the reflected light quantities (1) to (4) are explained below.

In the four-layer disk 100, since the fourth reflective layer 9 is formed of an alloy mainly composed of aluminum, the reflectivity is about 82 percent. As the required characteristic of the third reflective layer 7, when the value of the reflectivity of the third reflective layer 7, and the value obtained by multiplying the reflectivity (82 percent) of the fourth reflective layer 9 by the square of the transmissivity of the third reflective layer 7 are equal to each other, the reflected light quantity from the fourth reflective layer 9 and the reflected light quantity from the third reflective layer 7 are equal to each other.

FIG. 2(a) and FIG. 2(b) show the reflectivity, transmissivity, and absorption rate in a laminated structure (wavelength: 405 nm) consisting of a layer of an alloy mainly composed of silver ($Ag_{98.1}Pd_{0.9}Cu_{1.0}$ of Furuya Metal), and a layer of titanium oxide (TiOx, where x is 1.8 or more to 2.2 or less). In FIG. 2(a), the thickness of titanium oxide is fixed at 40 nm, and the thickness of the alloy mainly composed of silver is changed, and in FIG. 2(b), the thickness of the alloy mainly composed of silver is fixed at 10 nm, and the thickness of titanium oxide is changed.

According to FIG. 2(b), by setting the film thickness of titanium oxide at about 40 nm, the absorption rate can be suppressed at about 4 percent. As shown in FIG. 2(a), the combination of reflectivity and transmissivity for equalizing the both values is obtained when the film thickness of the silver alloy is about 10 nm, and the reflectivity is about 32 percent and the transmissivity is about 56 percent. The reflectivity shown in FIG. 2(a) includes the reflectivity of the acrylic substrate surface forming the laminated structure, and the reflectivity including the reflection of the acrylic substrate surface shown in FIG. 2(a) is about 40 percent.

As the required characteristic of the second reflective layer 5, it is all right when the value of the reflectivity of the second reflective layer 5 is equal to the value obtained by multiplying the reflectivity (32 percent) of the third reflective layer 7 by the square of the transmissivity of the second reflective layer 5.

FIG. 3 shows the reflectivity, transmissivity, and absorption rate of titanium oxide (TiOx, where x is 1.8 or more to 2.2 or less) used in the second reflectivity layer 5 in relation to the film thickness of titanium oxide (wavelength: 405 nm). As shown in FIG. 3, the combination of reflectivity and transmissivity for equalizing the both values is obtained when the film thickness of the titanium oxide is about 28 nm, and the reflectivity is about 18 percent and the transmissivity is about 75 percent. The reflectivity shown in FIG. 3 includes the reflectivity of the acrylic substrate surface forming the titanium oxide film, and the reflectivity including the reflection of the acrylic substrate surface shown in FIG. 3 is about 25 percent.

As the required characteristic of the first reflective layer 3, it is all right when the value of the reflectivity of the first reflective layer 3 is equal to the value obtained by multiplying the reflectivity (18 percent) of the second reflective layer 5 by the square of the transmissivity of the first reflective layer 3.

As shown in FIG. 3, the combination of reflectivity and transmissivity for equalizing the both values is obtained when the film thickness of the titanium oxide is about 20 nm, and the reflectivity is about 12 percent and the transmissivity is about 80 percent. However, the reflectivity including the reflection of the acrylic substrate surface shown in FIG. 3 is about 20 percent.

As shown in FIG. 2(a), FIG. 2(b), and FIG. 3, there are plural film thicknesses of each layer for obtaining the reflectivity and transmissivity satisfying the above relation. This is because the values of reflectivity and transmissivity vary repeatedly depending on the changes of film thickness by the interference effect of light, according to a certain period determined by the wavelength of light and refractive index of thin film. In the optical recording medium such as optical disk, the thinner the reflective layer, the more advantageous it is from the viewpoint of the production cost, and further since selection of a thicker film causes to increase deterioration of reproduction signal by interference, and hence it is desired to select the smallest film thickness for obtaining the same reflectivity and transmissivity. Generally, an optimum film thickness is set in one period of repetitive period formed at the smallest film thickness side.

Optical constants of materials for composing reflective layers may vary depending on the difference in conditions for forming the reflective layers, or difference or variation of manufacturing equipment. In such a case, the relation between the film thickness of the material for composing each reflective layer and the reflectivity, transmissivity and absorption rate varies more or less, and it is necessary to select an optimum film thickness conforming to the forming condition of the reflective film.

The information recorded in the four-layer disk 100 is supported by undulations or phase pits of the first to fourth information recording planes (3a, 5a, 7a, 9a). As shown in FIG. 1, by emitting laser beam from the lower side in the diagram, the reflected light of laser beam from each reflective light is received, and the information recorded in the four-layer disk 100 is read. That is, the information recorded in four information recording planes of the four-layer disk 100 can be read from one side of the four-layer disk by means of laser beam.

Referring now to FIG. 4 and FIG. 5, the manufacturing method of the four-layer disk 100 is explained. FIG. 4 shows the process up to formation of the first reflective layer 3, and FIG. 5 shows the process up to formation of the third-reflective layer 7.

Figure 4A:
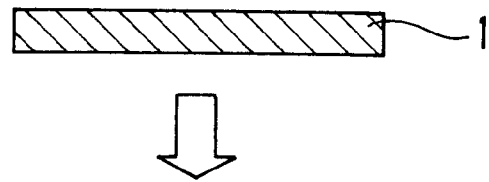
FIG. 4 is a diagram showing a process up to forming of a first reflective layer, in which (a) shows a glass substrate, (b) shows a process following (a), (c) shows a process following (b), (d) shows a process following (c), (e) shows a process following (d), and (f) shows a process following (e)
Figure 4B:
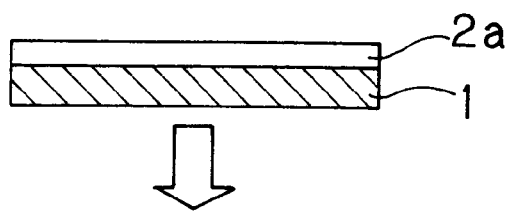
Figure 4C:
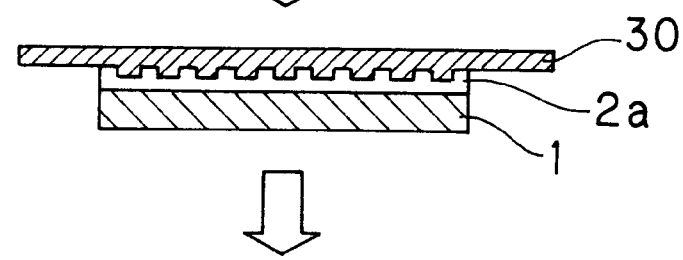
Figure 4D:
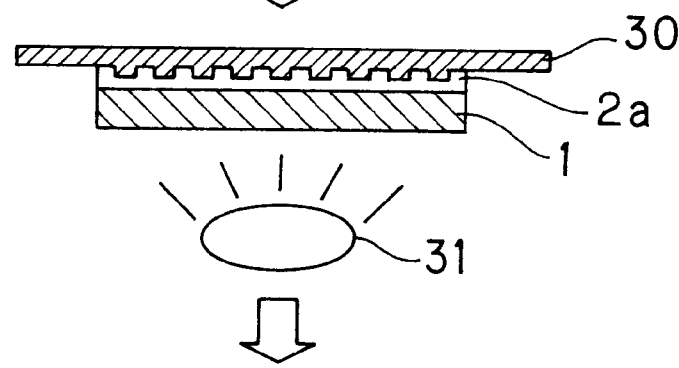
Figure 4E:
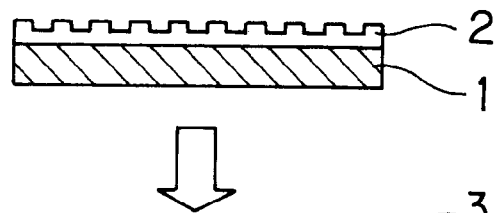
Figure 4F:
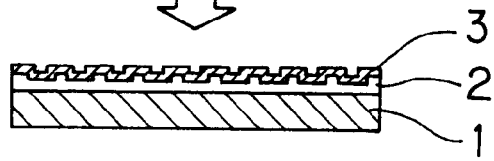

On a glass substrate 1 in FIG. 4(a), a liquid photosetting resin 2a (for example, ultraviolet curing resin MP-121 of Mitsubishi Rayon) is applied as shown in FIG. 4(b), and a nickel (Ni) stamper 30 in a shape corresponding to the pits for composing the information recording plane is pressed as shown in FIG. 4(c). Further, as shown in FIG. 4(d), the photosetting resin 2a is cured by irradiating with light of a high pressure mercury lamp 31, and the stamper 30 is removed, so that a first transfer layer 2 is formed as shown in FIG. 4(e). Next, as shown in FIG. 4(f), a first reflective layer 3 is formed on the surface of the first transfer layer 2 by sputtering method in a desired film thickness. Thus, the method known as the 2P transfer method can be generally employed.

Then, as shown in FIG. 5, a second transfer layer 4, a second reflective layer 5, a third transfer layer 6, and a third reflective layer 7 are formed in the same process as in FIG. 4(a) to FIG. 4(f). That is, as shown in FIG. 5(a), the second transfer layer 4 is formed by applying a photosetting resin 4a on the surface of the first reflective layer 3, pressing with a stamper 30A, and curing. On the surface of the second transfer layer 4, the second reflective layer 5 is formed by sputtering. As shown in FIG. 5(b), the third transfer layer 6 is formed by applying a photosetting resin 6a on the surface of the second reflective layer 5, pressing with a stamper 30B, and curing. On the surface of the third transfer layer 6, the third reflective layer 7 is formed by sputtering.

The fourth transfer layer 8 and fourth reflective layer 9 are formed same as the other transfer layers and reflective layers. Further, on the surface of the fourth reflective layer 9, a photosetting resin is applied as an adhesive layer 10, and a second substrate 11 of the same material as the first substrate 1 is overlaid, and the photosetting resin is cured to adhere the second substrate 11, so that a four-layer disk 100 is manufactured.

Results of evaluation of the four-layer disk 100 formed in the embodiment are explained.

The four-layer disk 100 was reproduced by using a blue-violet semiconductor laser with wavelength of 401 nm, an objective lens with numerical aperture NA 0.6, a spherical aberration correction device using the originally developed liquid crystal, and an originally developed signal processing device. As a result, on the first information recording plane 3a, the jitter of the reproduced signal was 8.5 percent and the reflectivity of I14H was 16.1 percent. Similarly, on the second information recording plane 5a, the jitter of the reproduced signal was 8.6 percent and the reflectivity of I14H was 17.6 percent, on the third information recording plane 7a, the jitter of the reproduced signal was 8.1 percent and the reflectivity of I14H was 19.3 percent, and on the fourth information recording plane 9a, the jitter of the reproduced signal was 9.5 percent and the reflectivity of I14H was 14.4 percent. Thus, according to the optical recording medium of the embodiment, fluctuations of reproduced signals on the information recording planes corresponding to the reflective films can be suppressed small.

In the embodiment, the third reflective layer 7 was formed in a laminated structure consisting of a layer of an alloy mainly composed of silver ($Ag_{98.1}Pd_{0.9}Cu_{1.0}$) and a layer of titanium oxide (TiOx, where x is 1.8 or more to 2.2 or less), but the third reflective layer may be formed only of a layer of an alloy mainly composed of silver.

Figure 6:
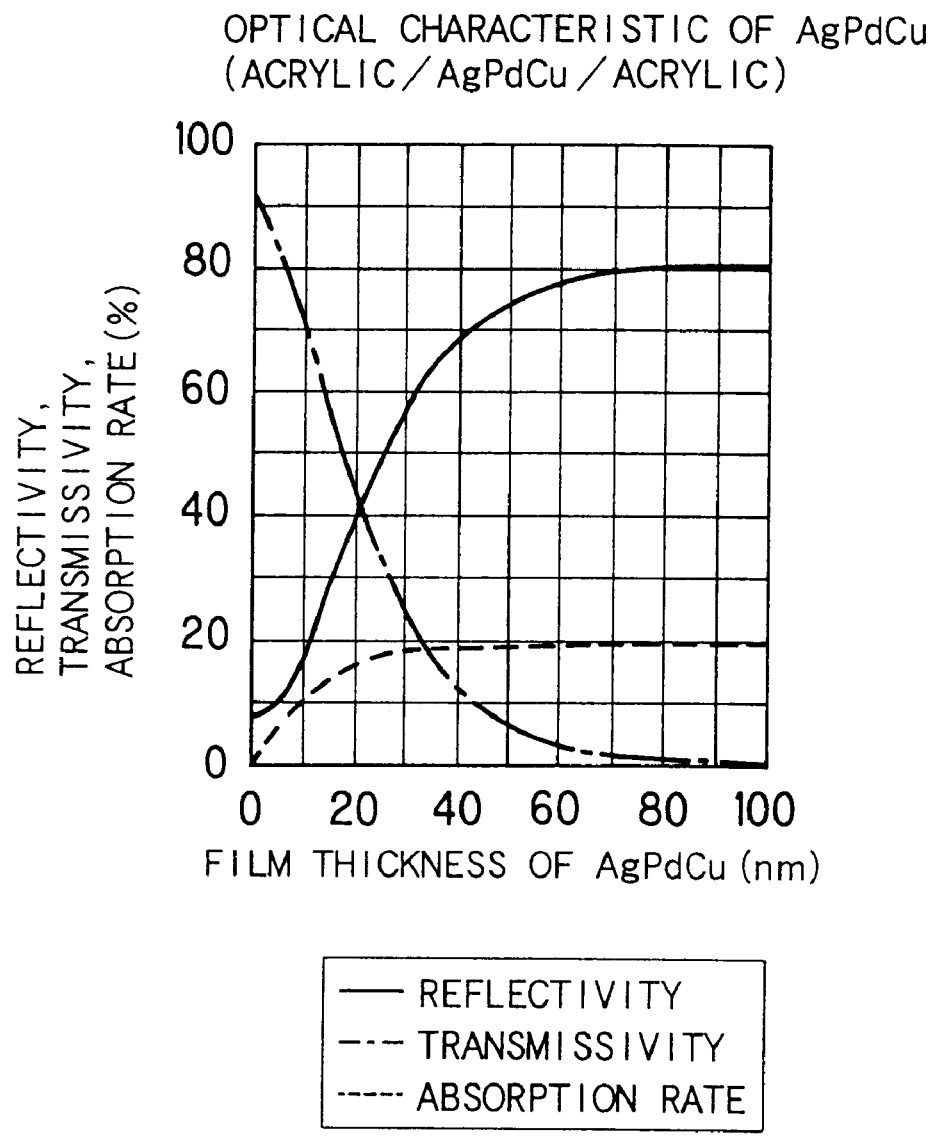
FIG. 6 is a diagram showing reflectivity, transmissivity, and absorption rate of the alloy mainly composed of silver in relation to the film thickness of this alloy.

FIG. 6 shows the reflectivity, transmissivity and absorption rate of the alloy mainly composed of silver ($Ag_{98.1}Pd_{0.9}Cu_{1.0}$), in relation to the film thickness of the alloy (wavelength: 405 nm). As clear from comparison with FIG. 2(a), as compared with the laminated structure, the layer formed only of the alloy mainly composed of silver has a larger absorption rate in the region of a thin film thickness. Accordingly, when the third reflective layer is compared with the laminated structure, in the case of the single layer of silver alloy, the allowable range of the film thickness of the third reflective layer is narrower, and it is possible to cause demerits in manufacture. Therefore, as the third reflective layer, it is preferred to use a laminated structure.

In the embodiment, each transfer layer is formed by using a liquid photosetting resin, but, instead of the liquid photosetting resin, a semisolid photosetting resin sheet may be used. Generally, by using the thermosetting resin sheet, instead of applying a liquid photosetting resin, unevenness of thickness of transfer layer is smaller, occurrence of aberration due to uneven thickness of transfer layer is suppressed, and even when reproducing pits recorded at higher density, a multi-layer disk less in deterioration of reproduced signal and excellent in quality can be manufactured.

In the foregoing embodiment, the manufacturing method by the 2P method is shown, but the manufacturing method is not limited to this method alone, and may include, for example, injection molding and other methods. For example, a substrate corresponding to the first substrate 1 and transfer layer 2 in FIG. 1 may be manufactured as an integral member by injection molding, or a substrate corresponding to the second substrate and adhesive layer 10 in FIG. 1 may be manufactured as an integral member by injection molding. When manufacturing the optical recording medium by using these substrates, the number of transfer layers formed by using photosetting resin can be decreased, so that the productivity of the optical recording medium may be enhanced.

The entire disclosure of Japanese Patent Application No. 2000-236478, filed on Aug. 4, 2000 including the specification, claims, drawings and summary is incorporated herein by reference in its entirety.

What is claimed is:

1. An optical recording medium readable from one side comprising at least four information recording planes and reflective layers formed on each information recording plane, respectively, wherein the first and the second reflective layer has a layer mainly composed of titanium oxide, the third reflective layer has a layer made of an alloy mainly composed of silver or a layer formed by laminating the layer of alloy mainly composed of silver and a layer mainly composed of titanium oxide, and the fourth reflective layer has a layer made of an alloy mainly composed of aluminum.

2. The optical recording medium according to claim 1, wherein each of the titanium oxide in the first, second and third reflective layers is composed of oxygen/titanium at a ratio of 1.8 or more to 2.2 or less, respectively.

3. The optical recording medium according to claim 1, wherein the layer mainly composed of titanium oxide in the first, second and third reflective layers is either amorphous or fine crystal composition.

4. The optical recording medium according to claim 1, wherein the thickness of the first, second and third reflective layers is 80 nm or less, respectively.

5. The optical recording medium according to claims 1, wherein the alloy mainly composed of silver in the third reflective layer contains either palladium or ruthenium, and either copper or titanium, and the ratio of silver in the composition is 94 percent or more.

6. The optical recording medium according to claims 1, wherein the thickness of the layer of alloy mainly composed of silver in the third reflective layer is 20 nm or less.

7. The optical recording medium according to claims 1, wherein the alloy mainly composed of aluminum in the fourth reflective layer contains at least one of titanium, chromium, zinc, manganese, and copper, and the ratio of aluminum in the composition is 90 percent or more.

8. The optical recording medium according to claim 1, wherein the thickness of the layer of alloy mainly composed of aluminum in the fourth reflective layer is 20 nm or more.

9. The optical recording medium according to claim 1, wherein the ratio of maximum and minimum is 2 times or less, among the reflected light quantity from the first reflective layer, the reflected light quantity from the second reflective layer passing through first reflective layer, the reflected light quantity from the third reflective layer passing through the first reflective layer and second reflective layer, and the reflected light quantity from the fourth reflective layer passing through the first reflective layer, second reflective layer, and third reflective layer.

* * * * *